(12) United States Patent
Niksa et al.

(10) Patent No.: US 10,183,875 B2
(45) Date of Patent: Jan. 22, 2019

(54) POINT OF USE ELECTROLYSIS SYSTEM

(71) Applicant: Water Star, Inc., Newbury, OH (US)

(72) Inventors: Marilyn J. Niksa, Chardon, OH (US); Andrew J. Niksa, Chardon, OH (US)

(73) Assignee: Water Star, Inc., Newbury, OH (US)

( * ) Notice: Subject to any disclaimer, the term of this patent is extended or adjusted under 35 U.S.C. 154(b) by 1147 days.

(21) Appl. No.: 14/452,223

(22) Filed: Aug. 5, 2014

(65) Prior Publication Data

US 2015/0041410 A1    Feb. 12, 2015

Related U.S. Application Data

(60) Provisional application No. 61/863,133, filed on Aug. 7, 2013.

(51) Int. Cl.
*C02F 1/46*  (2006.01)
*C02F 1/467* (2006.01)

(52) U.S. Cl.
CPC ........ *C02F 1/4674* (2013.01); *C02F 2307/06* (2013.01); *C02F 2307/10* (2013.01); *C02F 2307/12* (2013.01)

(58) Field of Classification Search
CPC ...... C02F 1/4674; C02F 1/4676; C02F 3/202; C02F 2001/46166; C02F 2001/46171; C02F 2201/4619; C02F 2303/04; C02F 1/467; C02F 3/20; C02F 1/48; C02F 1/46; B01D 35/06
See application file for complete search history.

(56) References Cited

U.S. PATENT DOCUMENTS 1,420,838 A    6/1922  Held
3,692,180 A    9/1972  Laraus
(Continued)

FOREIGN PATENT DOCUMENTS

CN    100425546 C    10/2008
JP    2004116136 A    4/2004
KR    101035021 B1    5/2011

OTHER PUBLICATIONS

Water dispenser with sterilizing function and sterilizing method thereofXiao Zhibang (Inventor). Xiao Zhibang (Assignee). CN 101734764 A. (Published Jun. 16, 2010). and Translation (Year: 2010).*

(Continued)

*Primary Examiner* — Walter D. Griffin
*Assistant Examiner* — Cameron J Allen
(74) *Attorney, Agent, or Firm* — Fredrickson & Byron, P.A.

(57) ABSTRACT

A point of use electrolysis system can be used to generate oxidizing species within liquid retained by a point of use discharge nozzle, helping to prevent pathogens from growing and multiplying in the nozzle. In one example, a system includes a point of use discharge nozzle having an inlet and an outlet and electrodes. The electrodes are configured to electrochemically generate an oxidizing species within the point of use discharge nozzle. According to the example, the point of use discharge nozzle is configured to trap liquid from a liquid source, when liquid ceases flowing through the point of use discharge nozzle, thereby providing a trapped liquid. Further, the electrodes are configured to generate the oxidizing species within the trapped liquid.

19 Claims, 7 Drawing Sheets

(56) References Cited

U.S. PATENT DOCUMENTS

| | | | |
|---|---|---|---|
| 4,548,716 A | 10/1985 | Boeve | |
| 4,599,166 A | 7/1986 | Gesslauer | |
| 4,650,573 A | 3/1987 | Nathanson | |
| 4,767,528 A | 8/1988 | Sasaki et al. | |
| 5,167,927 A | 12/1992 | Karlson | |
| 5,250,177 A | 10/1993 | Cho | |
| 5,324,434 A * | 6/1994 | Oikawa | C02F 1/46104 204/228.1 |
| 5,366,619 A | 11/1994 | Matsui et al. | |
| 5,460,705 A | 10/1995 | Murphy et al. | |
| 5,540,819 A | 7/1996 | Bakhir et al. | |
| 5,611,088 A | 3/1997 | Almon | |
| 5,824,274 A | 10/1998 | Long | |
| 5,972,196 A | 10/1999 | Murphy et al. | |
| 6,045,704 A | 4/2000 | Sato et al. | |
| 6,085,540 A | 7/2000 | Davis | |
| 6,368,472 B1 * | 4/2002 | McGuire | C02F 1/46104 204/252 |
| 6,375,827 B1 | 4/2002 | Kurosu et al. | |
| 6,387,241 B1 | 5/2002 | Murphy et al. | |
| 6,458,257 B1 | 10/2002 | Andrews et al. | |
| 6,561,382 B2 | 5/2003 | Shelton | |
| 6,689,262 B2 | 2/2004 | Senkiw | |
| 6,866,806 B2 | 3/2005 | Andrews et al. | |
| 7,272,947 B2 | 9/2007 | Anderson et al. | |
| 7,309,441 B2 | 12/2007 | Rychen et al. | |
| 7,422,684 B1 | 9/2008 | Davis et al. | |
| 7,481,929 B2 | 1/2009 | Wilkins et al. | |
| 7,488,419 B1 | 2/2009 | Wang et al. | |
| 7,604,728 B2 | 10/2009 | Schlager | |
| 2004/0256306 A1 | 12/2004 | Watanabe et al. | |
| 2005/0023227 A1 | 2/2005 | Rychen et al. | |
| 2006/0266683 A1 | 11/2006 | Sung | |
| 2007/0108056 A1 * | 5/2007 | Nyberg | B01D 61/44 204/554 |
| 2010/0135869 A1 | 6/2010 | Shiue et al. | |
| 2011/0036761 A1 | 2/2011 | Chen et al. | |

OTHER PUBLICATIONS

"Electrochemical System Development," Water Star Inc., retrieved from https://web.archive.org/web/20081005061302/http:/waterstarinc.com/?id=7 on Feb. 17, 2015; archived on Oct. 5, 2008, two pages.

"Water Disinfection," Water Star Inc., retrieved from https://web.archive.org/web/20081005072537/http:/waterstarinc.com/?dir=8 on Jan. 22, 2015; archived on Oct. 5, 2008, three pages.

"Gas Diffusion Electrodes," Water Star Inc., retrieved from https://web.archive.org/web/20081005061257/http://waterstarinc.com/?id=17 on Jan. 22, 2015; archived on Oct. 5, 2008, two pages.

"Gallery of Projects," Water Star Inc., retrieved from https://web.archive.org/web/20081005072559/http:/waterstarinc.com/?id=20 on Jan. 22, 2015; archived on Oct. 5, 2008, two pages.

"Water Star Inc. Technology Resource Materials," Water Star Inc., retrieved from https://web.archive.org/web/20081005061242/http://waterstarinc.com/?dir=4 on Jan. 22, 2015; archived on Oct. 5, 2008, two pages.

"Final Report on Microbiological Testing of Oxygenated Peroxygenated Waters," Water Star Inc., Sep. 17, 2004, retrieved from https://web.archive.org/web/20081005061242/http://waterstarinc.com/?dir=4 on Feb. 17, 2015, six pages.

Coin, Richard J. et al. "Wastewater Treatment Enhanced by Electrochemistry", Environmental Progress, Summer 1996, six pages, vol. 15, No. 2; retrieved from https://web.archive.org/web/20081005061242/http:/waterstarinc.com/?dir=4, on Feb. 17, 2015.

Tennakoon, Charles L. K., et al., "Electrochemical Hydrogen Peroxide Generator", Tech Briefs, Oct. 1, 2010, two pages; retrieved from http://www.techbriefs.com/component/content/article/8625 on Feb. 24, 2015.

* cited by examiner

POINT OF USE ELECTROLYSIS SYSTEM

CROSS REFERENCE TO RELATED APPLICATIONS

This application claims priority to U.S. Provisional Patent Application No. 61/863,133 filed Aug. 7, 2013, the entire contents of which are incorporated herein by reference.

TECHNICAL FIELD

This disclosure relates to electrolysis systems and, more particularly, to electrolysis systems incorporated into point of use discharge nozzles.

BACKGROUND

Disinfection and detoxification of fresh water for human consumption and waste water for discharge to environment are topics of increasing importance as the population continues to grow and sources of sanitary water diminish. In view of these demands, municipalities and private users already routinely treat potable water and waste water with chlorine or other oxidants to deactivate biological activity in the water. Treating the water with such chemicals can kill bacteria and viruses, decolor and deodorize the water, and otherwise sanitize the water for subsequent use. In the case of fresh water production, source water is typically extracted from an aquifer or other body, processed in a fresh water treatment plant, and then discharged into a municipal water system. By contrast, waste water treated in a waste water plant is often discharged into an outdoor environment, such as a river or lake, after being processed.

While these existing technologies can provide effective water sterilization upon treatment, the effectiveness of the treatment can diminish over time. For example, if treated water subsequently comes into contact with bacteria-carrying and/or virus-carrying air or surfaces, the treated water can act as a breeding ground for various pathogens. Over time, the sterility of the treated water can diminish to the point where the water is no longer fit for consumption, bathing, or direct use. As one example, a faucet may retain water between the shutoff valve and the outlet when not in use. This retained water is generally not protected from invasion of airborne pathogens, potentially allowing pathogens to accumulate and grow within the retained water. Purging the retained water from the faucet prior to use can help ameliorate the problems of pathogenic penetration into the unprotected water column. Yet users often do not know to purge a faucet prior to use and, in the case of "smart" or touchless faucets, cannot purge the faucet without being in direct contact with the discharging contents. As a result, retained water within plumbing structures can be a health and safety risk.

SUMMARY

In general, this disclosure relates to electrolysis systems incorporated into plumbing components, such as point of use discharge nozzles. Example point of use discharge nozzles include, but are not limited to, sink faucet nozzles, drinking fountain nozzles, shower nozzles, refrigerator dispensing nozzles, and soda fountain nozzles. In some examples, the electrolysis system includes electrodes that are incorporated into the point of use discharge nozzle. The electrodes can be positioned between a shutoff valve of the point of use discharge nozzle and an outlet through which water discharges into the ambient environment. Upon closing the shutoff valve, water will cease flowing through the point of use discharge nozzle but will not completely evacuate from the nozzle. Instead, a small portion of water may be retained within the point of use discharge nozzle, for example, between the shutoff valve and the nozzle outlet. To help prevent pathogenic contamination of this retained water and also biofouling growth on the inside walls of the nozzle, the electrodes are positioned to generate an oxidizing species within the water. For example, the electrodes may operate continuously to generate oxidizing species within the retained water until there is an equilibrium concentration of the oxidizing species in the water (e.g., the rate at which the oxidizing species are consumed equals the rate at which new oxidizing species are generated). This may prevent contamination of the water retained in the discharge nozzle and also prevent biofouling on the inside of the discharge nozzle.

The oxidizing species electrolytically generated in the static water present within the point of use discharge nozzle can inhibit the growth of pathogens within the water and, correspondingly, on the walls of the discharge nozzle. For example, the concentration of oxidizing species generated by the electrolysis system in the static water may be sufficient to maintain bacteriostatic conditions, e.g., whereby any bacteria in the water cannot grow or multiply. When so implemented, the electrolysis system can help protect the otherwise unprotected water retained within the point of use discharge nozzle, e.g., when water is not flowing through the nozzle. Further, by inhibiting pathogenic growth and multiplication within the retained water, the oxidizing species can inhibit the formation of a pathogen-rich biofilm on the inside surfaces of the discharge nozzle. Were such a biofilm allowed to form, sterilized water subsequently passing through the discharge nozzle during operation can become contaminated with pathogens from the biofilm. Thus, the oxidizing species may significantly reduce or eliminate contamination of both the static water retained by the discharge nozzle when not in use and also sterilized water flowing from a source when the nozzle is in use.

In some applications, the electrolysis system can be implemented to create a barrier layer of water rich in oxidizing species. The barrier layer can be positioned adjacent the outlet of the fluid nozzle such that any air entering the fluid nozzle (e.g., air containing pathogens) must flow through the oxidizing species-rich barrier layer. In this way, the electrolysis system can guard against invasive airborne pathogens. While the electrolysis system may also generate oxidizing species when water is flowing through the point of use discharge nozzle, the volume of water flowing through the nozzle may dilute any generated oxidizing species to a concentration below that required to kill or inhibit the growth of pathogens. In such applications, the electrolysis system may generate higher concentrations of oxidizing species in static (e.g., non-flowing) volumes of water.

In one example, a point of use electrolysis system is described that includes a point of use discharge nozzle and electrodes. The point of use discharge nozzle has an inlet configured to receive liquid from a liquid source and an outlet configured to discharge the liquid into an ambient environment. The electrodes include an anode and a cathode configured to electrochemically generate an oxidizing species within the point of use discharge nozzle. According to the example, the point of use discharge nozzle is configured to trap liquid from the liquid source, when liquid is not flowing through the point of use discharge nozzle, thereby providing a trapped liquid, and the electrodes are configured to generate the oxidizing species within the trapped liquid.

In another example, a method is described that includes retaining liquid received from a liquid source in a point of use discharge nozzle, when liquid is not flowing through the point of use discharge nozzle, to thereby provide a trapped liquid. The point of use discharge nozzle has an inlet configured to receive the liquid from the liquid source and an outlet configured to discharge the liquid into an ambient environment. The example method also includes electrochemically generating an oxidizing species within the trapped liquid in the point of use discharge nozzle via electrodes that comprise an anode and a cathode.

In another example, an electrolysis system is described that includes a plumbing component in fluid communication with a liquid source and electrodes. The example specifies that when liquid is flowing from the liquid source the liquid flows through the plumbing component, and when liquid ceases flowing from the liquid source the plumbing component retains a trapped volume of the liquid, the trapped volume of liquid being in contact with air from an ambient environment. The example further specifies that the electrodes include an anode and a cathode configured to electrochemically generate an oxidizing species within the trapped volume of liquid retained by the plumbing component.

The details of one or more examples are set forth in the accompanying drawings and the description below. Other features, objects, and advantages will be apparent from the description and drawings, and from the claims.

DETAILED DESCRIPTION

In general, the disclosure relates to devices, systems, and techniques for electrolytically generating oxidizing species within a static fluid exposed to a gaseous environment, such as ambient air. In some examples, electrodes are installed within a plumbing component, such as a point of use discharge nozzle, and configured to electrolytically generate the oxidizing species within the plumbing component. In accordance with these examples, the plumbing component may have a fluid pathway through which fluid intermittently flows during operation. When fluid is not flowing through the plumbing component, however, a portion of the fluid may be retained within the fluid pathway, creating a static volume of fluid. This static (e.g., non-flowing) volume of fluid may be exposed to air and, if left untreated, prone to contamination, e.g., as pathogens on the walls of the fluid pathway or from the air enter the fluid and begin to multiply within the fluid. This process can result in the contamination of the static volume of fluid and, in turn, the formation of pathogen-containing biofouling inside the plumbing component.

To help prevent contamination of the static volume of fluid and the formation of biofouling, an electrolysis system can be provided with electrodes positioned within the static volume of fluid. The electrodes can electrolytically generate oxidizing species within the static volume of fluid. These oxidizing species can inhibit the infiltration and/or growth of any pathogens in the static volume of fluid, helping to maintain the sterility of the fluid and prevent a biofoulant from growing on the walls of the plumbing component. Accordingly, if a user were to subsequently ingest or come into physical contact with the static volume of fluid, for example by opening a faucet valve that pushes the previously static volume of fluid out of the faucet, the user can avoid being exposed to pathogen-rich fluid. In addition, by inhibiting biofouling from forming inside the plumbing component, the user can help avoid being exposed to pathogens that may otherwise transfer into a sanitary fluid as the fluid flows through the plumbing component and in contact with the biofouling.

While avoiding exposure to unsanitary fluid is consistent with good practice for most individuals, the benefits may be of particular importance for those with compromised immune systems. For example, patients in hospitals, cancer wards, burn centers, and other medical environments often have greater susceptibility to infection due to their inhibited immune systems. For these individuals, exposure to even relatively low levels of pathogens can have significant consequences. By electrolytically generating chemical species within static fluid exposed to an ambient environment, pathological invasion and growth in the static fluid can be inhibited.

Figure 1:
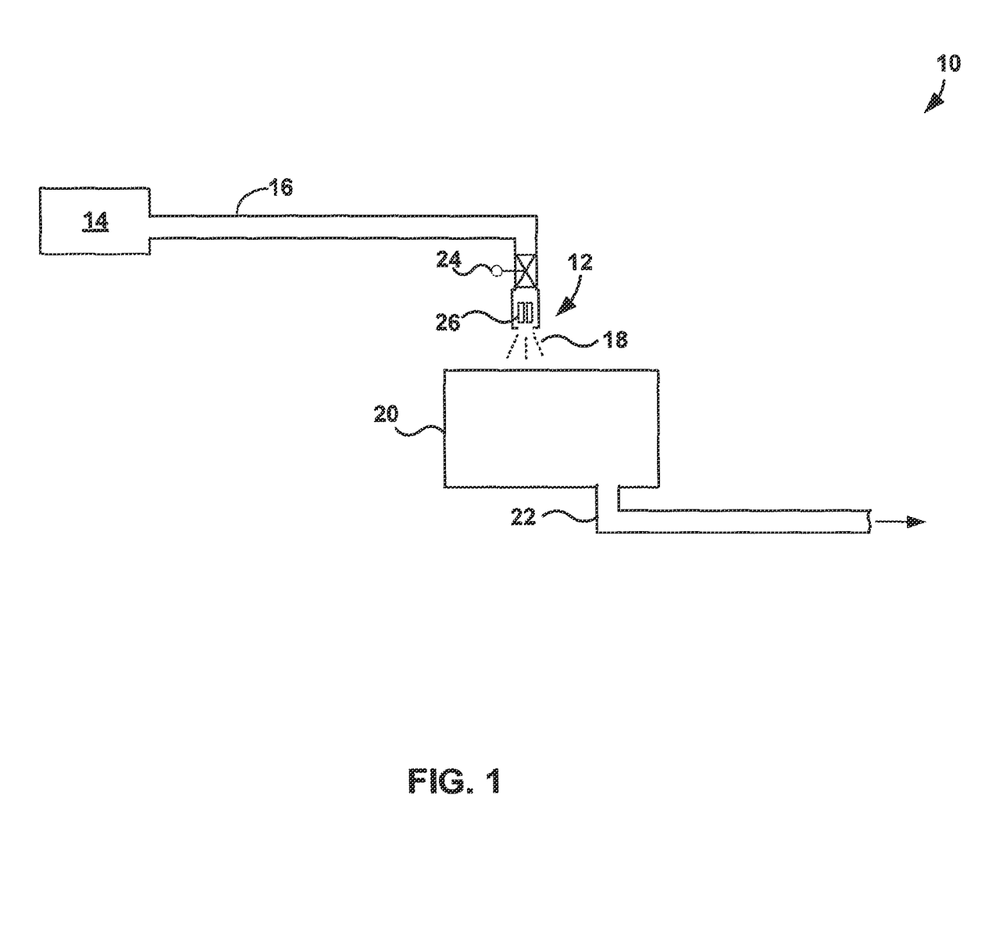
FIG. 1 is an illustration of an example fluid system in which an electrolysis system is installed in the housing of a point of use discharge nozzle.

FIG. 1 is an illustration of an example fluid system 10 in which an electrolysis system is installed in the housing of a point of use discharge nozzle 12 (also referred to herein as "discharge nozzle 12") to generate oxidizing species within fluid retained in the nozzle housing. In this example, point of use discharge nozzle 12 is fluidly connected to a fluid source 14 via a conduit 16. Point of use discharge nozzle 12 is positioned on a terminal end of conduit 16 and configured to receive liquid from fluid source 14 and discharge the liquid into an ambient atmosphere 18. In particular, in the illustrated example, point of use discharge nozzle 12 is positioned to discharge liquid through the ambient atmosphere 18 into a basin 20 having an outlet 22 connected to a sewer system. Point of use discharge nozzle 12 includes a shutoff valve 24 that controls fluid flow from fluid source 14 to basis 20. When shutoff valve 24 is in an open position, fluid can flow through conduit 16, through point of use discharge nozzle 12, and into ambient atmosphere 18 and basin 20. By contrast, when shutoff valve 24 is in a closed position, fluid does not flow through point of use discharge nozzle 12. Instead, fluid flow from fluid source 14 is blocked by shutoff valve 24.

Although fluid does not flow through discharge nozzle 12 when shutoff valve 24 is closed, residual fluid may nevertheless be retained in the discharge nozzle. For example, as will be described in greater detail, residual fluid may be retained in discharge nozzle 12 between shutoff valve 24 and ambient environment 18. The retained fluid may be fluid originating from fluid source 14 that traveled past and/or through shutoff valve 24 prior to completely closing the valve but that does not exit discharge nozzle 12. This retained fluid may be a static (e.g., non-flowing) volume of fluid that is in communication with air from ambient environment 18.

To help inhibit pathogenic growth and multiplication within the static fluid retained by discharge nozzle 12 and biofouling accumulation inside the discharge nozzle, among other uses, fluid system 10 includes electrodes 26. Electrodes 26 are positioned in contact with the static fluid in discharge nozzle 12. Electrodes 26 include at least one anode and at least one cathode. In operation, electrodes 26 electrolytically generate oxidizing chemical species within the retained fluid. These oxidizing species may attack bacteria, viruses, and/or other impurities attempting to grow and/or invade the static fluid, e.g., from ambient environment 18. In this manner, fluid system 10 can help protect against pathogenic contamination of any fluid stored in discharge nozzle 12 when fluid is not flowing through the nozzle.

The concentration of the oxidizing species in the retained fluid may be comparatively low or nonexistent immediately upon closing shutoff valve 24 and trapping the fluid in discharge nozzle 12. Over time, however, the concentration of the oxidizing species in the retained fluid may increase as electrodes 26 continue to generate additional oxidizing species within the fluid. The concentration may continue increasing until equilibrium conditions are reached in which the rate at which new oxidizing species are generated equals the rate at which existing oxidizing species are destroyed. In such applications, the ability of the static fluid to resist pathogenic invasion and growth can increase the longer the fluid is left unpurged in discharge nozzle 12.

As will be described in greater detail below (FIGS. 2-4), electrodes 26 are electrically connected to a power source that drives the electrodes, creating an electrical field that generates the chemical species within the liquid held by discharge nozzle 12. In one example, fluid system 10 includes a battery electrically connected to electrodes 26. The battery can be positioned in discharge nozzle 12 and/or adjacent the discharge nozzle to supply DC power to the electrodes. In another example, electrodes 26 are connected to alternating current line power (e.g., wall power) that is transmitted through an electrical distribution network from a power generation station. In such an example, fluid system 10 includes an alternating current-to-direct current converter to convert the incoming alternating current to direct current that is then supplied to electrodes 26.

Independent of the source of the power driving electrodes 26, the electrodes may be configured to generate an oxidizing species within the static fluid retained by the discharge nozzle. The type or types of oxidizing species generated by the electrodes can vary, e.g., based on the configuration of the electrodes and the chemical composition of the fluid within discharge nozzle 12. Example oxidizing species that can be generated by electrodes 26 include, but are not limited to, hypochlorite, hypochlorous acid, chlorine dioxide, ozone, hydrogen peroxide, hypobromite, hypobromous acid, and hypofluorous acid. In one example, electrodes 26 are configured to generate hydrogen peroxide. Main reactions for generating hydrogen peroxide include:

1. Cathode: $2e^- + O_2 + H_2O \rightarrow HO_2^- + OH^-$
2. Anode: $H_2O \rightarrow \frac{1}{2} O_2 + 2H^+ + 2e^-$
3. Overall: $\frac{1}{2} O_2 + 2H_2O \rightarrow 2HO_2^- + OH^- + 2H^+$
4. Followed by: $HO_2^- + H_2O \rightarrow H_2O_2 + OH^-$ The type of oxidizing species generated by electrodes 26 may be selected based on the types of pathogens prone to invade discharge nozzle 12 and, correspondingly, the effectiveness of different types of oxidizing species at inhibiting those pathogens. Hydrogen peroxide has a comparatively high solubility in water, allowing residual water in discharge nozzle 12 to be infused with comparatively high concentrations of hydrogen peroxide. Further, the decomposition products of hydrogen peroxide are environmentally benign, comprising water and oxygen. By contrast, ozone has a comparatively low solubility in water. This can result in a lower concentration of the oxidizing species being present in the residual water in discharge nozzle 12 as compared to if hydrogen peroxide were generated in the residual water. This can also necessitate a longer residence time to reach a concentration sufficient to inhibit pathogen activity in the residual fluid. Further, halogen based oxidizing species may require that a halide source be added to the fluid retained by the discharge nozzle, increasing the complexity of the electrolysis system. Notwithstanding these distinctions, electrodes 26 can be configured to generate any suitable oxidizing species, and an electrolysis system in accordance with the disclosure is not limited to generating any particular type of oxidizing species.

During operation, electrodes 26 generate oxidizing species within a volume of fluid contained in discharge nozzle 12. The concentration of the oxidizing species in the fluid will vary, e.g., based on the oxidizing species production rate of electrodes 26, the volume of fluid in the nozzle, and the amount of time the fluid has been present within the nozzle. To help avoid pathogenic contamination of the residual fluid in the nozzle and, correspondingly, growth of a biofilm inside the nozzle, electrodes 26 can generate an amount of oxidizing species sufficient to substantially inhibit (and, in other examples, entirely inhibit) growth and/or multiplication of pathogens in the residual fluid. Such pathogens may enter the fluid in the form of airborne contaminates carried by air within the ambient environment 18 surrounding an outlet opening of discharge nozzle 12. In addition, in applications where pathogens are already present on the wall surfaces of discharge nozzle 12 and/or in the fluid entering the nozzle, such pathogens may be prone to multiply within the static fluid held in the nozzle, were oxidizing species not generated by electrodes 26.

As one example, electrodes 26 may be configured to generate oxidizing species at a rate sufficient such that the pathogenic count in the fluid retained in discharge nozzle 12 does not exceed (and, in other examples, substantially exceed) the pathogenic count of the fluid entering the discharge nozzle from fluid source 14. For example, electrodes 26 may generate oxidizing species at a rate and/or an amount of oxidizing species sufficient to establish bacteriostatic conditions in the water retained by discharge nozzle 12. In accordance with these examples, if the fluid entering discharge nozzle 12 when shutoff valve 24 is open has a certain virus count and a certain bacteria count, the fluid retained in the nozzle after the shutoff valve is closed can have a virus count and bacteria count less than or equal to those of the entering fluid. Such a virus count and bacteria count can be measured after the fluid retained by discharge nozzle 12 has been held by the nozzle for a given period of time, such as greater than 5 minutes, greater than 30 minutes, greater than 1 hour, greater than 6 hours, greater than 24 hours, or greater than 48 hours.

Where fluid that enters discharge nozzle 12 and is subsequently retained in the nozzle contains pathogens, the oxidizing species generated by electrodes 26 may or may not kill the pathogens in the incoming fluid. That is, in addition to inhibiting the growth or multiplication of new pathogens in the retained fluid, the electrolytically generated oxidizing species may or may not also kill pathogens present in the incoming fluid. The efficacy of the electrolytically generated oxidizing species to kill pathogens entering the nozzle with the incoming fluid may depend, e.g., on the residence time of the fluid in the nozzle before it is purged and the rate at which electrodes 26 generate oxidizing species.

Although electrodes 26 can generate oxidizing species at any suitable rate and to any suitable concentration in the fluid retained within discharge nozzle 12, in some examples, the electrodes generate an amount of oxidizing species sufficient to provide an oxidizing species concentration greater than 0.5 parts per million (ppm) in the retained fluid. For example, the electrodes may generate an amount of oxidizing species sufficient to provide an oxidizing species concentration greater than 2 ppm, greater than 5 ppm, greater than 10 ppm, greater than 50 ppm, greater than 200 ppm, or greater than 1000 ppm. In other examples, the electrodes generate an amount of oxidizing species sufficient to provide an oxidizing species concentration less than a certain concentration, such as less than 2500 ppm, less than 1000 ppm, less than 500, less than 200 ppm, less than 100 ppm, less than 50 ppm, or less than 25 ppm. For example, the electrodes may generate an amount of oxidizing species sufficient to provide an oxidizing species concentration ranging from approximately 0.5 ppm to approximately 2000 ppm, such as from approximately 1 ppm to approximately 750 ppm, from approximately 2 ppm to approximately 200 ppm, from approximately 10 ppm to approximately 50 ppm, from approximately 25 ppm to approximately 75 ppm, or from approximately 30 ppm to approximately 150 ppm. The oxidizing species concentration provided by electrodes 26 may be measured when the concentration in the retained fluid reaches equilibrium conditions, where the rate at which new oxidizing species are generated equals the rate at which existing oxidizing species are destroyed.

Although increasing the amount of oxidizing species generated by electrodes 26 can increase the anti-pathogenic efficacy of fluid system 10, increasing the production rates of the oxidizing species can increase the power demands of the electrolysis system. In applications where electrodes 26 are connected to line power, additional power demand by the electrodes may not be a significant design consideration. By contrast, in applications where electrodes 26 are powered by a battery, minimizing power demand can be useful to extend the service life of the battery. By designing the electrolysis system to produce a sufficient amount of oxidizing species to inhibit pathological contamination of the residual fluid but not produce excess oxidizing species, the service life of the battery may be maximized.

With further reference to FIG. 1, fluid system 10 includes discharge nozzle 12. Discharge nozzle 12 may be any type of structure that controls the discharge of liquid from conduit 16 into ambient environment 18. Discharge nozzle 12 may or may not include a spout or jet that is larger or smaller in cross-sectional area (e.g., diameter) than conduit 16 to which the nozzle is attached. Such a structure may cause a venturi effect that accelerates the flow of liquid discharging from nozzle 12 relative to the speed of fluid flowing through conduit 16. In some examples, such as when discharge nozzle 12 is used on a faucet, an aerator may be positioned between an outlet of the discharge nozzle and ambient environment 18. In some examples, discharge nozzle 12 is integrally (e.g., permanently) formed with conduit 16 to define a unitary structure where the discharge nozzle is inseparable from the conduit without causing material damage. In other examples, discharge nozzle 12 is removable from conduit 16. In these examples, discharge nozzle 12 may be connected to conduit 16 by corresponding male and female threaded connections or other mechanical fixation features, allowing the discharge nozzle to be releasably attached and detached from the conduit.

In FIG. 1, discharge nozzle 12 is positioned at a terminal end of conduit 16. In this arrangement, discharge nozzle 12 may be the final structure that liquid from fluid source 14 passes through prior to discharging into an ambient, gaseous environment, for example, located between the outlet of the discharge nozzle and basin 20. Conduit 16 can be a pipe, hose, tube, or other structure capable of conveying liquid fluid from fluid source 14 to and through the discharge nozzle. When shutoff valve 24 is closed so that fluid is not flowing through discharge nozzle 12, the outlet of the discharge nozzle may be exposed to air in ambient environment 18, including any pathogens (e.g., viruses, bacteria, protozoan parasites, other organisms) that may be present therein, such that the air can enter at least a portion of the space between shutoff valve 24 and the outlet of the nozzle. In some examples, a distance separating shutoff valve 24 from an outlet of discharge nozzle 12 is less than 10 meters, such as less than 2 m, less than 1 m, less than 0.5 m, less than 0.2 m, or less than 0.1 m.

Fluid system 10 and point of use discharge nozzle 12 can be used in any applications in which it is desired to intermittently deliver liquid to a dispensing location in which the liquid will be used. As examples, point of use discharge nozzle 12 can be implemented as a sink faucet nozzle, a drinking fountain nozzle, a shower nozzle, a refrigerator water dispensing nozzle, a soda fountain nozzle, a garden hose nozzle, or any other suitable type of fluid outlet.

Fluid source 14 will vary depending on the application in which discharge nozzle 12 is implemented. In one example, fluid source 14 is a pressurized water main that delivers pressurized water having passed through a municipal water treatment plant. Water from such a source may have a bacteria count less than 0.01 milligrams/liter (e.g., less than 0.0001 mg/L) and a virus count less than 0.01 milligrams/liter (e.g., less than 0.0001 mg/L). For example, water from such a source may have a count of less than 0.01 mg/L (e.g., less than 0.0001 mg/L) for each of *Cryptosporidium, Giardia lamblia*, Heterotrophic plate count (HPC), *Legionella*, Total Coliforms (including fecal coliform and *E. Coli*), and viruses. When water with these bacteria and virus concentrations is retained in discharge nozzle 12, oxidizing species generated by electrodes 26 may prevent the bacteria and virus concentrations from exceeding those of the incoming water. In other examples, fluid source 14 may include a container, tank, tote, or other reservoir containing a fixed volume of fluid to be delivered through discharge nozzle 12.

In some additional examples, point of use discharge nozzle 12 can be used in a system that includes a touchless sensor configured to control the supply of liquid from fluid source 14 to the discharge nozzle. The touchless sensor can include an infrared sensor, magnetic sensor, optical sensor, or other sensor capable of detecting motion and/or the proximity of an individual to the sensor. In response to detecting an individual's presence, the touchless sensor can send an electric control signal that causes shutoff valve 24 to open and allows fluid to flow through discharge nozzle 12. Touchless faucets that may utilize a touchless sensor and point of use discharge nozzle include those commonly found in public restrooms, on public drinking fountains, in commercial kitchens, in hospital facilities, and the like. Because these types of touchless faucets often cannot be activated without an individual being in contact with the discharging contents, it is difficult to purge the faucets of residual contaminated water.

Shutoff valve 24 functions to control liquid flow from fluid source 14 to and/or through discharge nozzle 12. In general, shutoff valve 24 may be any device that regulates the flow of fluid by opening or closing fluid communication through a fluid conduit. In various examples, shutoff valve 24 may be a diaphragm valve, ball valve, check valve, gate valve, slide valve, piston valve, rotary valve, shuttle valve, and/or combinations thereof. In some examples, shutoff valve 24 is integrated into a housing that also contains discharge nozzle 12, such as a sink faucet that contains a faucet valve and an integrated discharge nozzle. In other examples, shutoff valve 24 is physically separate from a housing containing discharge nozzle 12. For example, shutoff valve 24 can be physically separate from discharge nozzle 12 and connected to the discharge nozzle with a conduit or other intermediate structure separating the shutoff valve from the discharge nozzle. In still other examples, fluid system 10 does not include shutoff valve 24. In these examples, fluid flow to discharge nozzle 12 may be controlled by starting or stopping a pump, attaching or detaching a fluid source to a conduit containing the discharge nozzle, or similar fluid control techniques.

In the example of FIG. 1, fluid system 10 also includes basin 20. Basin 20 may be a reservoir that is positioned to receive liquid exiting from discharge nozzle 12 including, e.g., liquid exiting discharge nozzle 12 and falling under the force of gravity. In different examples, basin 20 is a sink, a drinking fountain, a shower stall, a bathtub, or a trough under a refrigerator water dispensing nozzle or soda fountain nozzle.

Figure 2:
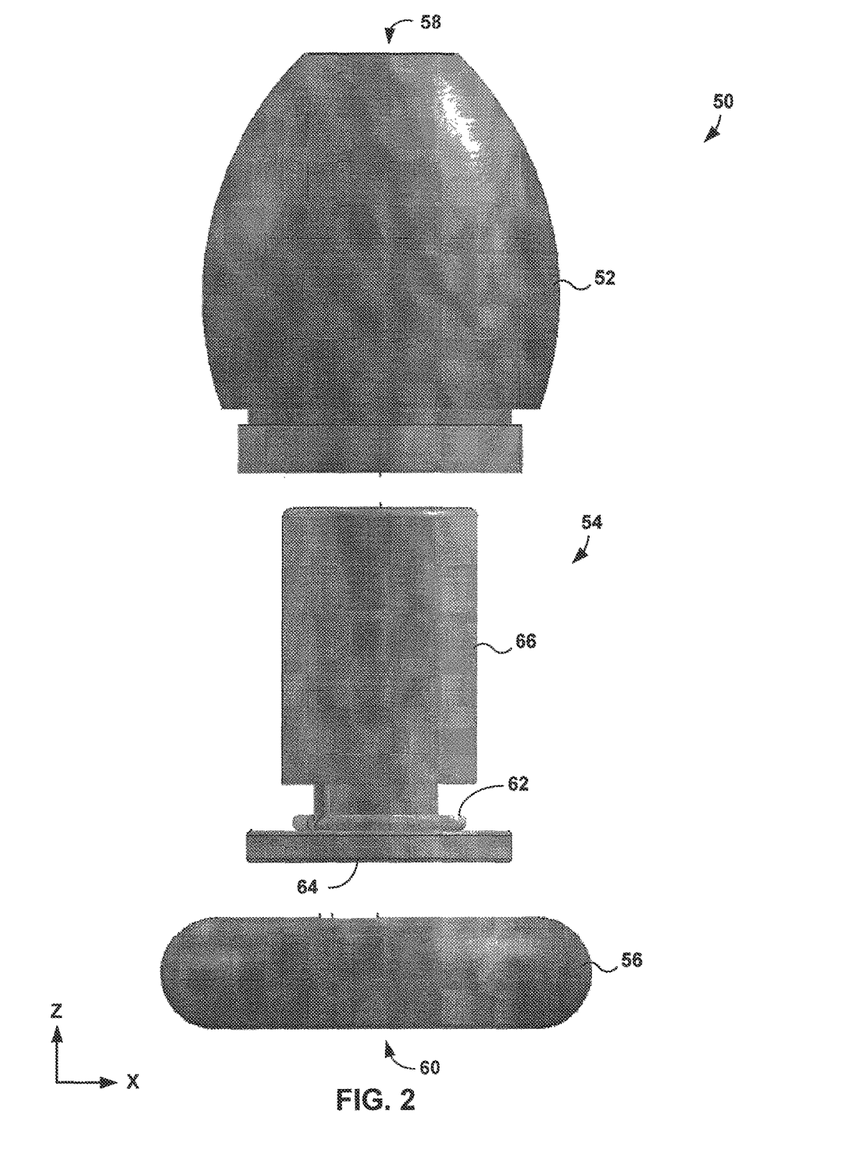
FIGS. 2-4 are drawings of an example configuration of a point of use discharge nozzle that can be used in the example fluid system of FIG. 1.
Figure 3:
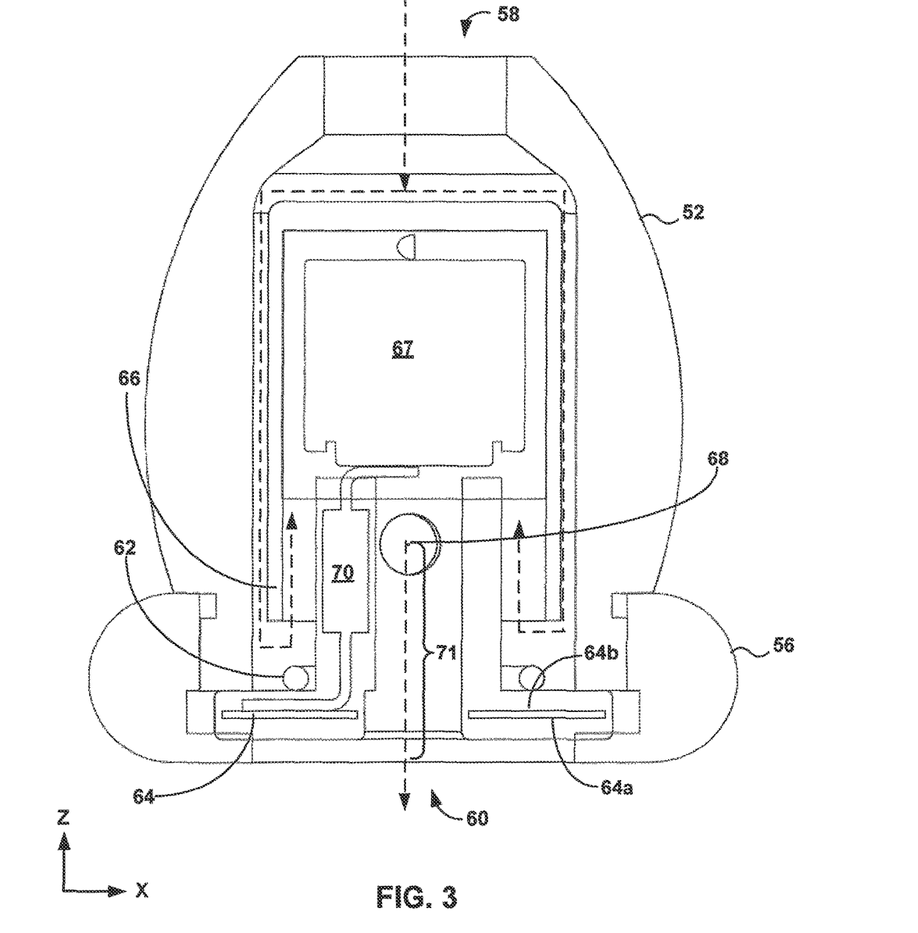
Figure 4:
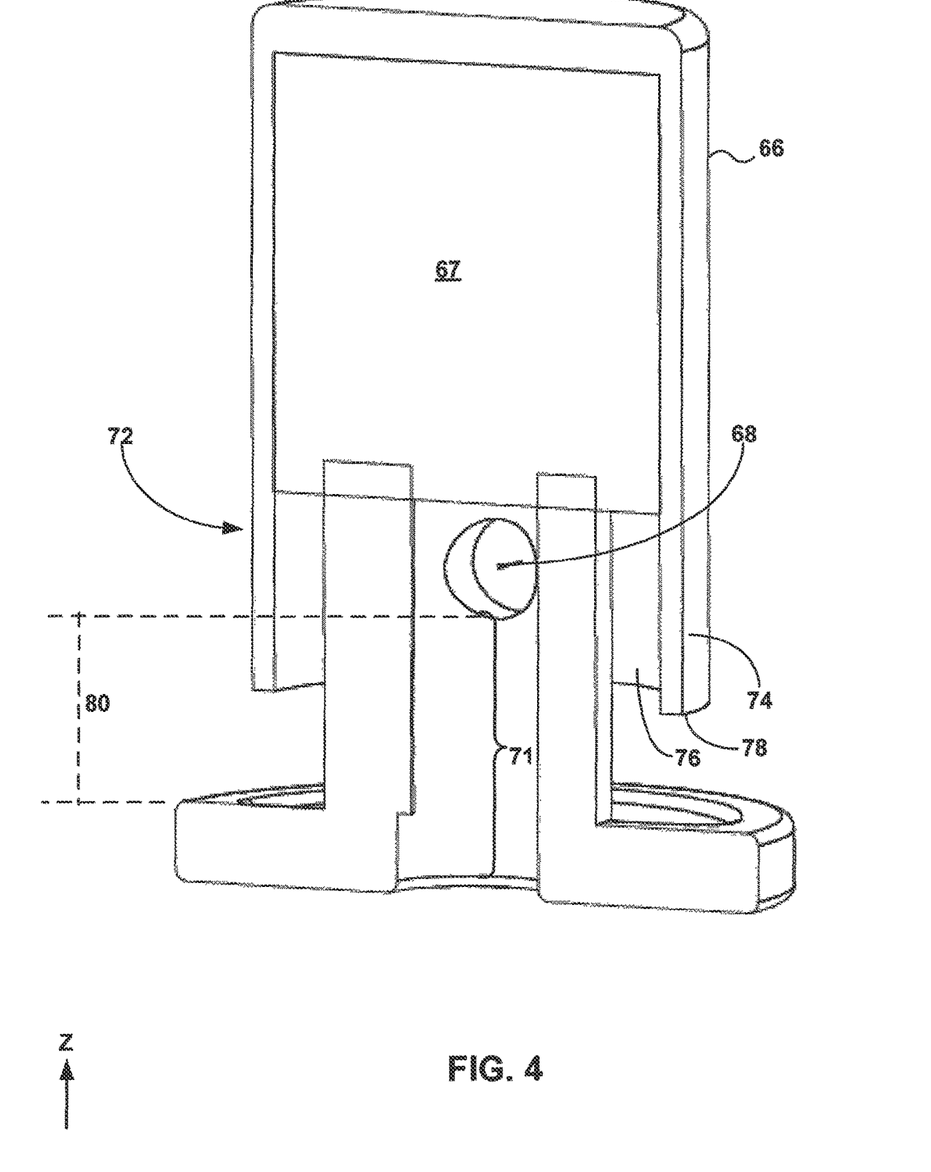

An electrolysis system implemented in a point of use discharge nozzle (FIG. 1) can have a number of different physical configurations. FIGS. 2-4 are drawings of one example configuration of a point of use discharge nozzle 50 (also referred to herein as "discharge nozzle 50") including an electrolysis system. The configuration of point of use discharge nozzle 50 (FIGS. 2-4) can be used by point of use discharge nozzle 12 (FIG. 1) in fluid system 10 or in applications beyond fluid system 10.

With reference to FIG. 2, discharge nozzle 50 includes a housing 52, an electrolytic species generator 54, and a locking member 56. Electrolytic species generator 54 is shown outside of and insertable into housing 52 in FIG. 2. To assemble discharge nozzle 50 in the example of FIG. 2, electrolytic species generator 54 is inserted into housing 52 (e.g., in the Z-direction shown on FIG. 2) and locking member 56 is attached to the housing, thereby mechanically securing the electrolytic species generator between the housing and the locking member. When electrolytic species generator 54 is inserted into housing 52 and locking member 56 is secured (FIG. 3), discharge nozzle 50 may define a bounding cavity that has an inlet 58 receiving fluid from a source (e.g., fluid source 14 in FIG. 1) and an outlet 60 discharging fluid into an ambient environment (e.g., ambient environment 18 in FIG. 1). In instances in which fluid is flowing through discharge nozzle 50, the fluid may flow around and through electrolytic species generator 54. When fluid ceases flowing through the discharge nozzle, however, residual fluid may be retained within housing 52. For example, as will be described in greater detail, housing 52 and/or electrolytic species generator 54 may include a trap structure that physically traps fluid within housing 52, preventing the housing from completely evacuating of liquid when liquid is not flowing through the housing.

Electrolytic species generator 54 is configured to electrolytically generate oxidizing species within liquid in housing 52. Electrolytic species generator 54 includes an anode 62, a cathode 64, and a trap 66. Anode 62 is spaced from cathode 64 such that, when fluid is retained within housing 52, the anode and cathode are both in contact with the retained fluid and the retained fluid bridges the separation gap between the anode and the cathode. Trap 66 is positioned between inlet 58 of the discharge nozzle and outlet 60. Trap 66 may be a physical structure that fluid passing through housing 52 must flow around in order to travel from the inlet to the outlet. For example, trap 66 may be a structure that prevents fluid entering inlet 58 from flowing in a linear pathway though housing 52 by requiring the fluid to flow around the trap in order to discharge through outlet 60. In some examples, trap 66 defines a reservoir that holds liquid fluid in discharge nozzle 50, thereby generating a trapped pool of liquid in which anode 62 and cathode 64 can generate oxidizing species. In some additional examples, trap 66 defines a housing that houses a battery powering electrolytic species generator 54. Although electrolytic species generator 54 is illustrated as a module structure in which anode 62, cathode 64, and trap 66 are held together to define a unitary structure, in other examples, the electrolytic species generator may be formed of separate components that, in combination, function to provide the features attributed to electrolytic species generator 54 in this disclosure.

Point of use discharge nozzle 50 can be used in a variety of applications in which it is desired to deliver liquid to a dispensing location in which the liquid will be used, such as those described above with respect to discharge nozzle 12 in FIG. 1. To install discharge nozzle 50, inlet 58 can be mechanically attached to a fluid conduit (e.g., conduit 16) in fluid communication with a liquid source. To facilitate installation in these applications, inlet 58 may define threading or other fixation elements configured to mate with corresponding threading or fixation elements on the fluid conduit. When housing 52 is installed on the fluid conduit and electrolytic species generator 54 is inserted into the housing, locking member 56 can be locked onto housing 52, securing the electrolytic species generator in the housing. In some examples, locking member 56 is a ring that has threading or other mechanical fixation elements configured to mate with corresponding threading or mechanical fixation elements on housing 52. In such examples, locking member 56 may be detachably secured to housing 52 to facilitate periodic removal of electrolysis species generator 54 from housing 52. Periodically removing electrolysis species generator 54 from housing 52 may be useful, for example, to clean housing 52, service various components of the electrolysis species generator, replace a battery of the electrolysis species generator (if present), or the like. Although electrolysis species generator 54 is removable from housing 52 via a releasable locking member 56 in the example of FIG. 2, in other examples, the electrolysis species generator and/or locking member may be permanently attached to the housing, and it should be appreciated that the disclosure is not limited in this respect.

FIG. 3 is a cross-sectional view of discharge nozzle 50 taken in the X-Z plane of FIG. 2. As shown in this example, electrolytic species generator 54 is installed in housing 52 with locking member 56 secured on the housing to frictionally engage the electrolytic species generator between a sidewall of the housing and the locking member. When so secured, electrolytic species generator 54 may be prevented from moving within housing 52, e.g., when fluid is flowing through the housing. FIG. 3 also illustrates an example arrangement of anode 62, cathode 64, and trap 66 described above with respect to FIG. 2. In this example, trap 66 houses a battery 67 that is electrically connected to anode 62 and cathode 64 to power the electrodes for generating oxidizing species within the housing. In particular, in the illustrated example, battery 67 is electrically connected to cathode 64 via a resistor 70. Resistor 70 may limit current draw from cathode 64 to extend the service life of the battery. Other electrical arrangements for electrolysis species generator 54 are both possible and contemplated. For example, electrolysis species generator 54 may not include resistor 70 or may include a different number or arrangement of resistors. As another example, electrolysis species generator 54 may not include battery 67 but may be connected to line power, e.g., via an electrical trace extending through housing 52 and electrically connected to anode 62 and cathode 64.

During operation of discharge nozzle 50 in which fluid is flowing through the nozzle, fluid enters housing 52 via inlet 58. Upon entering housing 52, the fluid impinges upon trap 66 and is diverted laterally around the sides of the trap. The fluid travels down the sides of the trap (e.g., in the direction of gravity and/or in the negative Z-direction indicated on FIG. 3) whereupon the fluid passes anode 62 and cathode 64. The fluid subsequently travels in a substantially opposite direction (e.g., against gravity and/or in the positive Z-direction indicated on FIG. 3) into the interior of trap 66 before passing through a discharge aperture 68. From discharge aperture 68, the fluid passes through an outlet channel 71 defined by the trap before exiting discharge nozzle 50 via outlet 60. In such an arrangement, fluid passing through discharge nozzle 50 travels in a serpentine pathway, with the fluid flow changing direction relative to the direction of gravity at least twice.

FIG. 4 is a cross-sectional illustration of trap 66 from FIG. 3 showing the trap positioned outside of housing 52. In this example, trap 66 has a sidewall 72 that defines a first side 74, a second side 76 opposite the first side, and an end surface 78 connecting the first side to the second side. The end surface 78 of sidewall 72 is at a different elevation than the elevation of discharge aperture 68 (e.g., a lower elevation with respect to gravity and/or a lower elevation in the negative Z-direction indicated on FIG. 4). Accordingly, when fluid is flowing through trap 66, the fluid flows along the first side 74 of sidewall 72, around end surface 78, and back along second side 76 before entering discharge aperture 68 and outlet channel 71. When fluid ceases flowing through discharge nozzle 50, residual fluid can be retained in the nozzle by trap 66. For example, the elevation difference between discharge aperture 68 and the bottom of trap 66 (designated by reference numeral 80 in FIG. 4) can create a reservoir that retains a trapped volume of fluid in discharge nozzle 50, when fluid is not flowing through the nozzle. The trapped volume of fluid is positioned so that anode 62 and cathode 64 (FIG. 3) are in contact with the fluid, allowing the electrodes to generate oxidizing species within the trapped volume of fluid.

Configuring discharge nozzle 50 with a trap, such as trap 66, may be useful to help provide a trapped volume of liquid in the nozzle, when fluid is not flowing through the nozzle, in which to generate oxidizing species. As discussed above with respect to FIG. 1, when fluid is not flowing through discharge nozzle 50, contaminants carried by a gas environment surrounding the nozzle can enter the nozzle through outlet 60. These contaminants may include pathogens, such as viruses and/or bacteria, that can grow and multiply within the nozzle. If discharge nozzle 50 did not include trap 66 and/or electrodes to generate oxidizing species, the pathogens could contaminate the wall surfaces of the discharge nozzle and any residual fluid with the nozzle. During subsequent use in which fluid was again passed through the discharge nozzle, a user may be exposed to discharging contaminants.

By configuring discharge nozzle 50 with a trapped volume of fluid in which electrodes generate oxidizing species, the trapped volume of fluid can filter and deactivate contaminants carried into the nozzle. For example, as airborne contaminants carried by the ambient environment surrounding discharge nozzle 50 enter the nozzle, the airborne contaminants may be directed through the trapped volume of fluid. The fluid may function to filter the contaminants from the air. Further, oxidizing species generated by the electrodes may react with the contaminants to render the contaminants harmless. Such an arrangement can help protect the sterility of any fluid retained within discharge nozzle 50 and/or an otherwise unprotected column of fluid extending behind the discharge nozzle.

With further reference to FIG. 3, discharge nozzle 50 can have a number of different configurations that provide a trapped volume of liquid in the nozzle, when fluid is not flowing through the nozzle. In the illustrated example, trap 66 provides a reservoir of trapped liquid between the base of the trap and discharge aperture 68. In other examples, a trapped volume of liquid can be provided in discharge nozzle 50 by creating a vacuum in the nozzle, when fluid stops flowing through the nozzle. For example, by designing nozzle 50 so that air cannot enter the nozzle when fluid is shut off to the nozzle (e.g., by closing shutoff valve 24 in FIG. 1), a vacuum will be generated in the nozzle as residual fluid attempts to discharge from the nozzle. This vacuum can provide a trapped volume liquid within the nozzle. Other configurations for providing a trapped volume of liquid in the discharge nozzle are possible.

In some examples, discharge nozzle 50 provides a trapped volume of liquid that is positioned such that substantially all (and, in other examples, all) gas that enters the nozzle from the ambient environment via outlet 60 passes through the trapped volume of liquid. For example, the trapped volume of liquid may be positioned so that substantially all (and, in other examples, all) air attempting to travel through discharge nozzle 50 from outlet 60 to inlet 58 must travel through the trapped volume of liquid. Preventing air from the ambient environment, and any contaminants contained therein, from bypassing the trapped volume of liquid may be useful to help prevent contaminants from bypassing the oxidizing species generated by the electrodes.

Independent of the specific technique used to provide the trapped volume of liquid within discharge nozzle 50, the amount of liquid trapped within the nozzle may vary, e.g., based on the size of the nozzle and the rate of oxidizing species production by the electrodes. In some examples, discharge nozzle 50 is configured to provide a trapped volume of liquid ranging from approximately 0.1 milliliters (ml) to approximately 1000 ml, such as from approximately 0.5 ml to approximately 500 ml, or from approximately 5 ml to approximately 50. In other examples, the trapped volume of liquid is less than a given value, such as less than 2500 ml, less than 1000 ml, less than 500 ml, less than 250 ml, less than 100 ml, or less than 50 ml. The trapped volume of liquid may be the volume of liquid in which the electrodes generate oxidizing species, when fluid is not flowing through the nozzle. In general, as the volume of liquid trapped by discharge nozzle 50 increases, the current and/or time needed to generate an oxidizing species concentration sufficient to effectively eliminate pathogen growth also increases. The electrodes may generate an amount of oxidizing species within the trapped volume of fluid sufficient to provide any suitable oxidizing species concentration, including those discussed above with respect to FIG. 1.

Electrolytic species generator 54 in the example of FIGS. 2 and 3 includes at least one anode and at least one cathode. In particular, in the illustrated example, electrolytic species generator 54 includes an anode 62 and a cathode 64. Anode 62 and cathode 64 may be selected based on the type of oxidizing species desired to be produced in the trapped liquid retained within discharge nozzle 50. In some examples, such as examples in which anode 62 and cathode 64 are configured to generate hydrogen peroxide, cathode 64 may be a gas diffusion electrode. Gas diffusion electrodes generally have a solid, electrically conducting catalyst positioned between a liquid medium and a gas medium. The solid, electrically conducting catalyst facilitates an electrochemical reaction between the liquid medium and gaseous medium.

In the example of FIG. 3, cathode 64 is positioned to define a bottom wall surface of housing 52. When installed, cathode 64 bounds the bottom surface of housing 52 (e.g., in the negative Z-direction indicated on FIG. 3) so as to retain trapped liquid in the housing. Cathode 64 defines a first side 64a and a second side 64b opposite the first side. The cathode first side 64a faces and is in contact with a gaseous ambient environment surrounding discharge nozzle 50. The cathode second side 64b faces and is in contact with liquid in the trapped volume of liquid retained by discharge nozzle 50.

Figure 5:
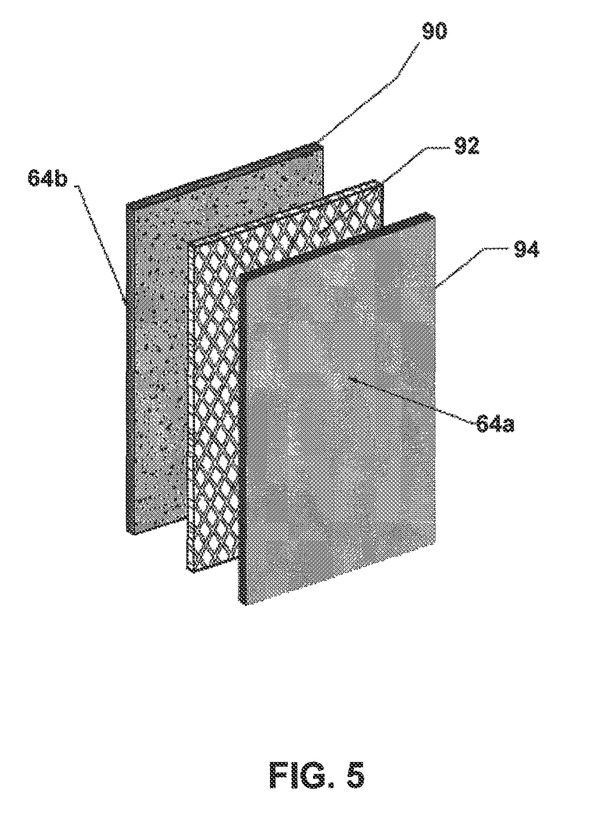
FIG. 5 illustrates an example configuration of a gas diffusion electrode that can be used as a cathode in an electrolysis system.

FIG. 5 illustrates one example configuration of a gas diffusion electrode that can be used as cathode 64. As shown, the gas diffusion electrode includes a catalyst layer 90, a support layer 92, and a gas permeable liquid barrier layer 94. Catalyst layer 90 may include a carbon cloth impregnated with a catalyst. Support layer 92 may provide structural support to the gas diffusion electrode and, in different examples, can be formed from a metal mesh, a ceramic mesh, or a thermoplastic mesh. The gas permeable liquid barrier layer 95 can be formed from a microporous material, such as a microporous plastic, that allows diffusion of gas (e.g., air) through the microporous material but does not allow passage of liquid through the material.

With further reference to FIG. 3, electrolytic species generator 54 also includes anode 62. As with cathode 64, anode 62 can be selected based on the type of oxidizing species to be generated by the electrolytic species generator. In some examples, anode 62 is a dimensionally stable anode that does not substantially change size and/or shape (and, in other examples, does not change size and/or shape) over the service life of the anode. Anode 62 can be fabricated from a valve metal substrate coated with a mixed metal oxide coating. Example mixed metal oxide coating includes mixtures of iridium oxide and ruthenium oxide along with one or more valve metal oxides.

During operation, discharge nozzle 50 (FIGS. 2-4) facilitates fluid flow from a liquid fluid source to an ambient environment. When liquid stops flowing through the discharge nozzle, a volume of trapped liquid is retained within the nozzle. Electrodes positioned in contact with this liquid can electrolytically generate oxidizing species within the trapped liquid. The oxidizing species can prevent airborne contaminants in contact with the liquid from contaminating the liquid, including other liquid and/or surfaces located behind the trapped liquid. Accordingly, when a user subsequently passes fresh liquid through discharge nozzle 50, the fresh liquid does not purge contaminated liquid from the nozzle. Were contaminated liquid to be purged from nozzle 50, the user may ingest the liquid, bathe in the liquid, or otherwise come into contact with the liquid.

Different fluid and electrolysis systems and techniques for generating an oxidizing species within a static volume of fluid have been described in relation to FIGS. 1-5. In general, these systems and techniques have been described in connection with a point of use discharge nozzle through which a liquid fluid intermittently passes, leaving the discharge nozzle exposed to airborne contaminants during periods in which liquid is not flowing through the nozzle. In other examples, the described systems and techniques may be implemented in plumbing components other than point of use discharge nozzles. For example, an electrolysis system may be implemented to generate oxidizing species in other types of plumbing components in which fluid intermittently flows and in which a static volume of fluid is maintained in the components when fluid is not flowing through them.

Figure 6:
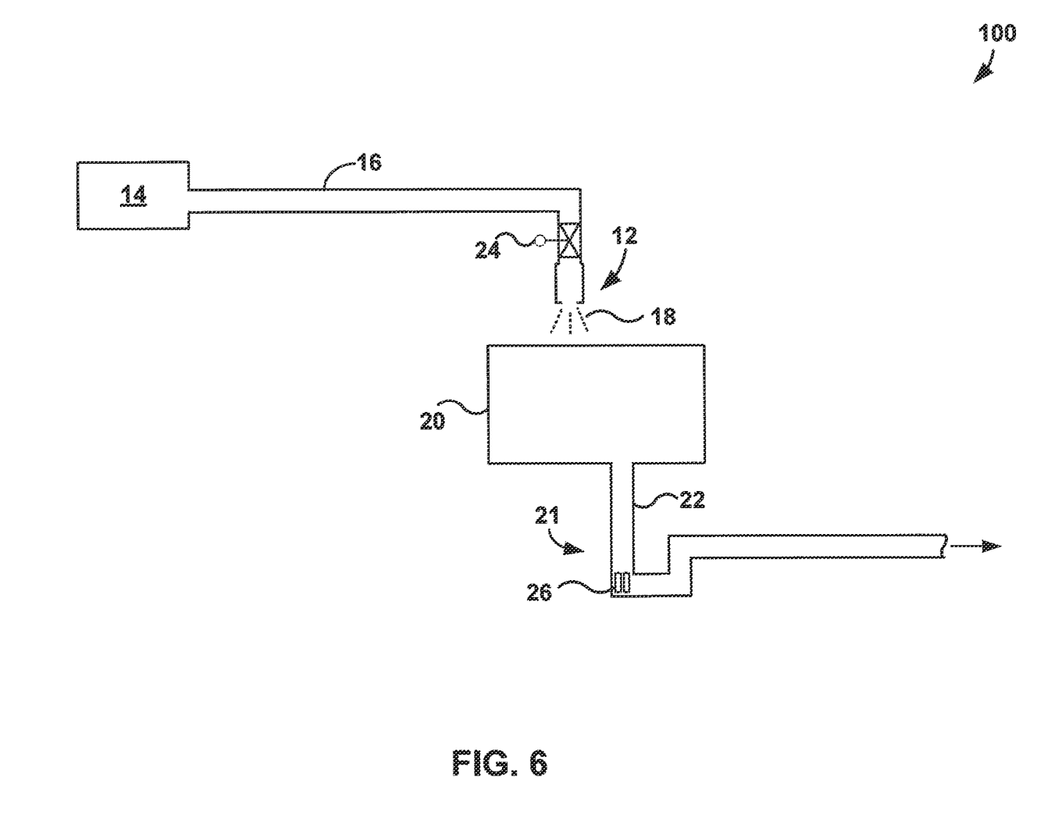
FIG. 6 is an illustration of an example fluid system in which an electrolysis system is installed in a plumbing component.

FIG. 6 is an illustration of an example fluid system 100 in which an electrolysis system is installed in a plumbing component to generate oxidizing species within fluid retained in the plumbing component. Example fluid system 100 is the same as fluid system 10 (FIG. 1) except that outlet 22 is shown having a plumbing trap 21 that can retain a trapped volume of liquid. In addition, in the example of fluid system 100, electrodes 26 are positioned in plumbing trap 21 instead of in point of use discharge nozzle 12. During use, fluid flows from fluid source 14 into basin 20 and subsequently exits the basin through outlet 22. The fluid passes through plumbing trap 21 as it discharges to the outlet. When fluid flow from source 14 is stopped, fluid ceases flowing through plumbing trap 21. This can leave a trapped volume of liquid retained in the plumbing trap. The trapped liquid may contain contaminants from articles processed within the basin (e.g., dirt, debris, organic matter such as food and hair, pathogens). In addition, the trapped liquid may be exposed to air containing yet further contaminants. If left untreated, the trapped liquid may cause unpleasant odors and emanate various pathogens. For example, if outlet 22 is subsequently clogged during use, unsanitary fluid previously residing in plumbing trap 21 may back up into basin 20, spreading the unsanitary liquid around the basin and any articles therein.

To help prevent odors, pathogen growth and multiplication, and/or other unsanitary conditions from developing in the trapped liquid retained in plumping trap 21, an electrolysis system can be installed with electrodes 26 positioned within the trapped liquid. Electrodes 26 can generate oxidizing species within the trapped liquid during operation as described above (FIGS. 1-5). Examples of plumbing components in which an electrolysis system can be installed include, but are not limited to, drains (e.g., sink drains, shower/bathtub drains), toilets, and garbage disposals.

Figure 7:
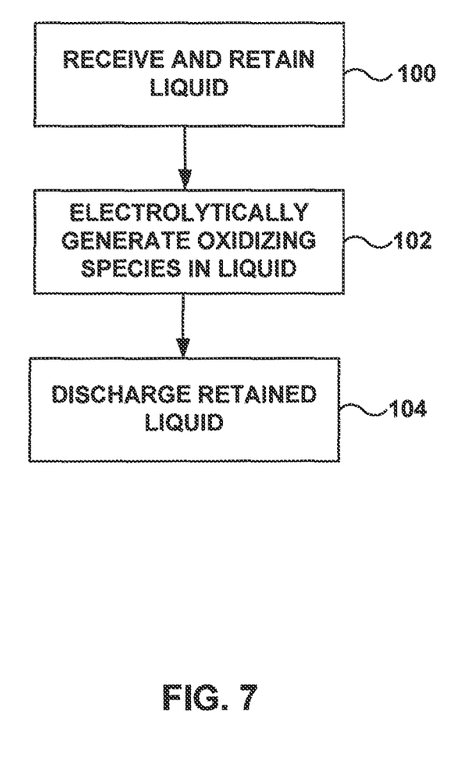
FIG. 7 is a flow chart illustrating an example method of electrolytically treating a volume of liquid.

FIG. 7 is a flow chart illustrating an example method of electrolytically treating a volume of liquid. In general, liquid is received from a liquid source and retained to create a trapped volume of liquid (100). The liquid may be received under pressure, e.g., from a pump, pressurized water main, or other source of pressurized liquid. The liquid may be retained in a plumbing component, such as a point of use discharge nozzle, that has a fluid inlet, a fluid outlet, and a liquid communication channel connecting the fluid inlet to the fluid outlet. Liquid can be retained within the plumbing component by stopping the flow of incoming liquid to the plumbing component and preventing a portion of liquid that has already entered the plumbing component from discharging. In one example, the plumbing component includes a physical trap to trap a volume of liquid in the component. In another example, the plumbing component includes a vacuum trap to trap a volume of liquid in the component. In yet another example, the plumbing component includes a gravity trap to trap a volume of liquid in the component.

The trapped volume of liquid may form a barrier layer extending across an entire cross-section of the plumbing component. The barrier layer may be positioned such that any air entering the plumbing component must contact and pass through the barrier layer to travel from the fluid outlet to the fluid inlet. Although the volume of the trapped liquid can vary, e.g., based on the size of the plumbing component, in some examples, the volume of liquid is less than 1 liter, such as less than 500 milliliters, or less than 100 milliliters. The trapped volume of liquid may be substantially static in that the liquid does not exit through a fluid outlet of the plumbing component (except, in some examples, via evaporation) and fresh liquid does not enter the trapped volume of liquid through a fluid inlet.

The example technique of FIG. 7 also includes electrolytically generating an oxidizing species within the trapped volume of liquid (102). An anode and a cathode can be positioned in the plumbing component in a location where the trapped volume of liquid resides, when liquid is trapped in the plumbing component. The anode and the cathode can electrolytically generate oxidizing species within the trapped volume of liquid. The concentration of the oxidizing species may be comparatively low when the liquid is initially trapped in the plumbing component but may increase over time as the anode and cathode continue to generate oxidizing species, e.g., until an equilibrium concentration is reached. In some examples, the anode and the cathode are powered continuously and continuously generate oxidizing species. In these applications, the anode and the cathode generate oxidizing species both when fluid is flowing through the plumbing component and when fluid is not flowing through the component. In other examples, the anode and cathode are powered intermittently and intermittently generate oxidizing species. In these applications, the anode and the cathode may only generate oxidizing species at certain times such as, e.g., when fluid is not flowing through the plumbing component or for a certain duration of time when fluid is trapped and retained within the component.

After oxidizing species have been generated in the trapped volume of fluid, the trapped volume of fluid is discharged from the plumbing component (104). The trapped volume of fluid retained in the plumbing component can be discharged by opening fluid communication between a fluid source and the plumbing component. As new fluid enters the plumbing component, the entering fluid can flush the trapped volume of fluid out of the component. The length of time the trapped volume of fluid will remain trapped in the component before being discharged will vary, e.g., based on how frequently the plumbing component is used. In some examples, the trapped volume of fluid is retained for a period greater than 5 minutes, such as greater than 30 minutes, greater than 1 hour, greater than 4 hours, greater than 8 hours, greater than 12 hours, or greater than 24 hours. By electrolytically generating an oxidizing species within the trapped volume of liquid, pathogen growth and multiplication within the liquid can be inhibited. Accordingly, a user coming in contact with the trapped volume of liquid when the liquid is subsequently discharged can avoid being exposed to high levels of pathogens and other contaminants.

The details of one or more examples are set forth in the accompanying drawings and the description below. Other features, objects, and advantages will be apparent from the description and drawings, and from the claims.

The invention claimed is:
1. A point of use electrolysis system comprising:
a point of use discharge nozzle defining an inlet configured to receive liquid from a liquid source and an outlet configured to discharge the liquid into an ambient environment; and
electrodes comprising an anode and a cathode configured to electrochemically generate an oxidizing species within the point of use discharge nozzle,
wherein the point of use discharge nozzle is configured to trap liquid from the liquid source, when liquid is not flowing through the point of use discharge nozzle, thereby providing a trapped liquid,
the electrodes are configured to generate the oxidizing species within the trapped liquid,
the outlet is exposed to an air in the ambient environment, and
the point of use discharge nozzle is configured to trap the liquid such that substantially any of the air that enters the point of use discharge nozzle from the ambient environment via the outlet passes through the trapped liquid.

2. The electrolysis system of claim 1, wherein the point of use discharge nozzle is configured to trap the liquid by maintaining a vacuum that prevents the trapped liquid from exiting the point of use discharge nozzle.

3. The electrolysis system of claim 1, wherein the point of use discharge nozzle comprises a barrier positioned between the inlet and the outlet configured to trap the liquid.

4. The electrolysis system of claim 1, wherein the point of use discharge nozzle comprises a housing and a trap configured to contain the trapped liquid, the trap defining an outlet end wall that bounds the housing, a discharge aperture, and an outlet channel extending through the outlet end wall from an interior of the chamber to the ambient environment, wherein the trap is configured to contain the trapped liquid between the outlet end wall and the discharge aperture.

5. The electrolysis system of claim 4, further comprising a power source configured to power the electrodes so as to electrochemically generate the oxidizing species, the power source comprising a battery positioned inside of the point of use discharge nozzle.

6. The electrolysis system of claim 1, wherein the air contains an airborne contaminant that comprises at least one of a virus and a bacterium, and the oxidizing species comprises at least one of hypochlorite, hypochlorous acid, chlorine dioxide, ozone, hydrogen peroxide, hypobromite, hypobromous acid, and hypofluorous acid.

7. The electrolysis system of claim 6, wherein the oxidizing species is hydrogen peroxide.

8. The electrolysis system of claim 1, wherein the electrodes are configured to electrochemically generate an amount of hydrogen peroxide within the trapped liquid sufficient to provide a hydrogen peroxide concentration within the point of use discharge nozzle of greater than 0.5 parts per million (ppm).

9. The electrolysis system of claim 8, wherein the hydrogen peroxide concentration ranges from approximately 2 ppm to approximately 200 ppm.

10. The electrolysis system of claim 1, wherein the cathode comprises a gas diffusion electrode, the cathode forming at least a portion of a wall of the point of use discharge nozzle, and the cathode defining a first side facing the ambient environment and a second side opposite the first side in contact with trapped liquid.

11. The electrolysis system of claim 10, wherein the anode is a dimensionally stable anode comprising a valve metal substrate coated with a mixed metal oxide coating.

12. The electrolysis system of claim 1, wherein the point of use discharge nozzle comprises one of a sink faucet nozzle, a drinking fountain nozzle, a shower nozzle, and a refrigerator water dispensing nozzle, and wherein the liquid source comprises a pressurized water main, and further comprising a shut-off valve positioned between the liquid source and the point of use discharge nozzle.

13. The electrolysis system of claim 1, further comprising an aerator positioned between the outlet of the point of use discharge nozzle and the ambient environment.

14. The electrolysis system of claim 1, further comprising a basin having a drain connected to a sewer system and a touchless sensor, wherein the outlet of the point of use discharge nozzle is positioned to discharge into the basin and the touchless sensor is configured to control liquid supply from the liquid source to the point of use discharge nozzle.

15. An electrolysis system comprising:
a plumbing component in fluid communication with a liquid source, wherein when liquid is flowing from the liquid source the liquid flows through the plumbing component, and wherein when liquid ceases flowing from the liquid source the plumbing component retains a trapped volume of the liquid, the trapped volume of liquid being in contact with gas from an ambient environment; and
electrodes comprising an anode and a cathode configured to electrochemically generate an oxidizing species within the trapped volume of liquid retained by the plumbing component,
wherein the trapped volume of liquid is less than 500 milliliters and the plumbing component comprises one of a sink faucet nozzle, a drinking fountain nozzle, a shower nozzle, a refrigerator water dispensing nozzle, a sink drain, a shower drain, and a toilet.

16. The electrolysis system of claim 15, wherein the plumbing component is configured to retain the trapped volume of liquid such that substantially all gas that enters the point of plumbing component passes through the trapped volume of liquid, and the electrodes are configured to generate an amount of the oxidizing species sufficient to inhibit growth of an airborne contaminant entering the trapped liquid from the ambient environment, the airborne contaminant comprising at least one of a virus and a bacterium.

17. The electrolysis system of claim 15, wherein the oxidizing species comprises at least one of hypochlorite, hypochlorous acid, chlorine dioxide, ozone, hydrogen peroxide, hypobromite, hypobromous acid, and hypofluorous acid.

18. The electrolysis system of claim 15, wherein the electrodes are configured to electrochemically generate an amount of hydrogen peroxide within the trapped volume of liquid sufficient to provide a hydrogen peroxide concentration within the faucet nozzle of greater than 0.5 parts per million (ppm).

19. The electrolysis system of claim 15, wherein the cathode comprises a gas diffusion electrode forming at least a portion of a wall of the plumbing component, the cathode defining a first side facing the ambient environment and a second side opposite the first side in contact with the trapped volume of liquid.

\* \* \* \* \*